Figure 13:
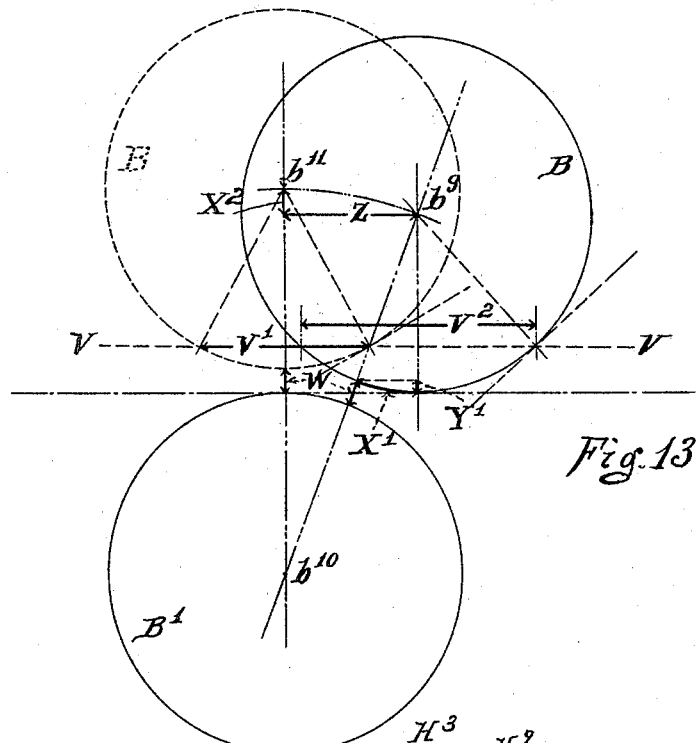

(No Model.) 9 Sheets—Sheet 1.

T. M. COCHRANE.
FUEL COMPRESSOR.

No. 584,327. Patented June 15, 1897.

Witnesses,
Frank Kenney.
James Brewer.

Inventor,
Thomas M. Cochrane.
by Atty N. DuBois.

(No Model.) 9 Sheets—Sheet 3.

T. M. COCHRANE.
FUEL COMPRESSOR.

No. 584,327. Patented June 15, 1897.

Witnesses,
Frank Henney
James Brewer

Inventor,
Thomas M. Cochrane
by Atty N. DuBois, (No Model.)

9 Sheets—Sheet 4.

T. M. COCHRANE.
FUEL COMPRESSOR.

No. 584,327. Patented June 15, 1897.

Witnesses,
Frank Henney.
James Brewer.

Inventor,
Thomas M. Cochrane,
by Atty N. DuBois.

(No Model.) 9 Sheets—Sheet 7.

T. M. COCHRANE.
FUEL COMPRESSOR.

No. 584,327. Patented June 15, 1897.

Fig. I.

Witnesses,
Frank Henney.
James Brewer.

Inventor,
Thomas M. Cochrane.
By Atty N. DuBois.

(No Model.) 9 Sheets—Sheet 8.
T. M. COCHRANE.
FUEL COMPRESSOR.

No. 584,327. Patented June 15, 1897.

Witnesses,
Frank Henney
James Brewer

Inventor,
Thomas M Cochrane.
by Atty N. DuBois, (No Model.) 9 Sheets—Sheet 9.

T. M. COCHRANE
FUEL COMPRESSOR.

No. 584,327. Patented June 15, 1897.

Witnesses,
Frank Kenney
James Brewer

Inventor.
Thomas M. Cochrane.
by Atty N. DuBois.

UNITED STATES PATENT OFFICE.

THOMAS M. COCHRANE, OF SPRINGFIELD, ILLINOIS, ASSIGNOR TO EDWARD B. COCHRANE, OF SAME PLACE.

FUEL-COMPRESSOR.

SPECIFICATION forming part of Letters Patent No. 584,327, dated June 15, 1897.

Application filed June 24, 1895. Serial No. 553,883. (No model.)

*To all whom it may concern:*

Be it known that I, THOMAS M. COCHRANE, a citizen of the United States, residing at Springfield, in the county of Sangamon and State of Illinois, have invented a certain new and useful Improvement in Fuel-Compressors, of which the following is such a full, clear, and exact description as will enable those skilled in the art to which it pertains to make and use my said invention.

My invention relates to machines of that class which are employed to produce from coal-dust, slack, or other suitable material mixed with binding material, such as coal-tar, compressed bricks or blocks of fuel of convenient form and size for use or transportation.

My invention in its entirety consists of means for crushing coal or other fuel material, means for pulverizing the same, means for mixing the binding material with the pulverized fuel material, means for conveying the mixture to the molds under the compressor-roll, means for keeping said material heated and in a plastic condition by the means of jets of steam forced into the material, means for compressing the material into bricks or blocks of convenient size, means for actuating the entire mechanism, means for superheating the steam which is mixed with the fuel material, and means for engaging and disengaging the several parts of the mechanism, so that the compressing mechanism may be run independently of the crushing, pulverizing, and conveying mechanism.

The purposes of invention are to provide a compressor-roll of novel and improved construction; to provide simple and effective means for conveying molds filled with fuel material successively under the compressor-roll in position to be pressed; to provide simple and effective means for loosening the pressed bricks or blocks in the molds, so that they may be readily discharged therefrom; to provide simple and effective means for crushing and pulverizing the fuel material and mixing therewith a controllable quantity of binding material; to provide simple and effective means for conveying the fuel material mixed with the binding material and impregnated with a controllable quantity of superheated steam to and depositing it in the molds, the delivery of the fuel material to the molds being automatically controlled, so as to deliver to the molds a constant supply, so that the rolls may operate continuously without being oversupplied with fuel material; to provide simple and effective means for vertical adjustment of the compressor-roll; to provide means for the adjustment of the rolls carrying the endless chain of molds, and to provide suitable actuating mechanism and connecting-gear so constructed and arranged that the several parts shall coöperate in the production of fuel-bricks, as hereinafter set forth.

With these ends in view my invention consists of novel features of construction and combination of parts shown in the annexed drawings, to which reference is hereby made, and hereinafter particularly described and specifically claimed.

In order to make the drawings of such size as will suitably illustrate my invention, I have shown the ground plan and the side elevation of the complete mechanism each in two parts.

Figure 1:
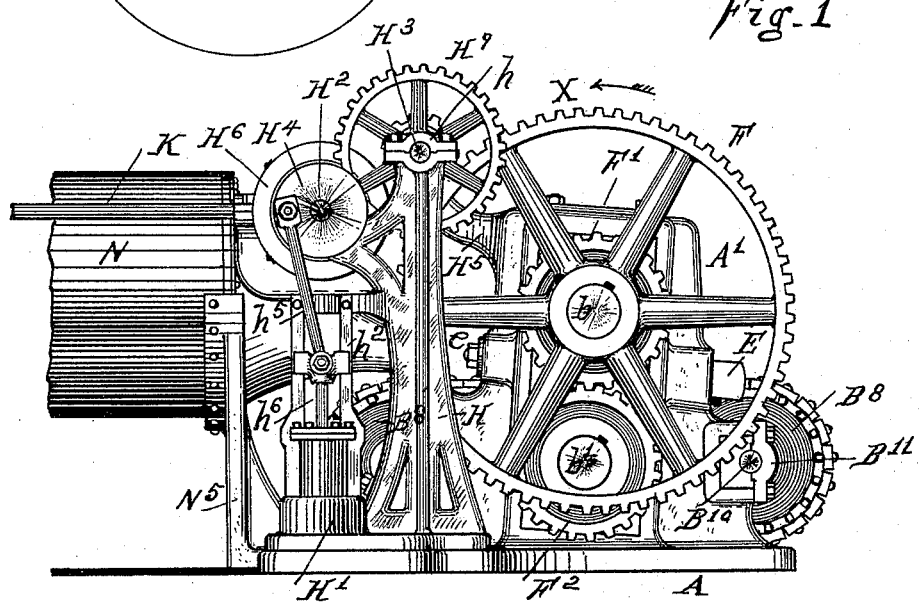
Figure 2:
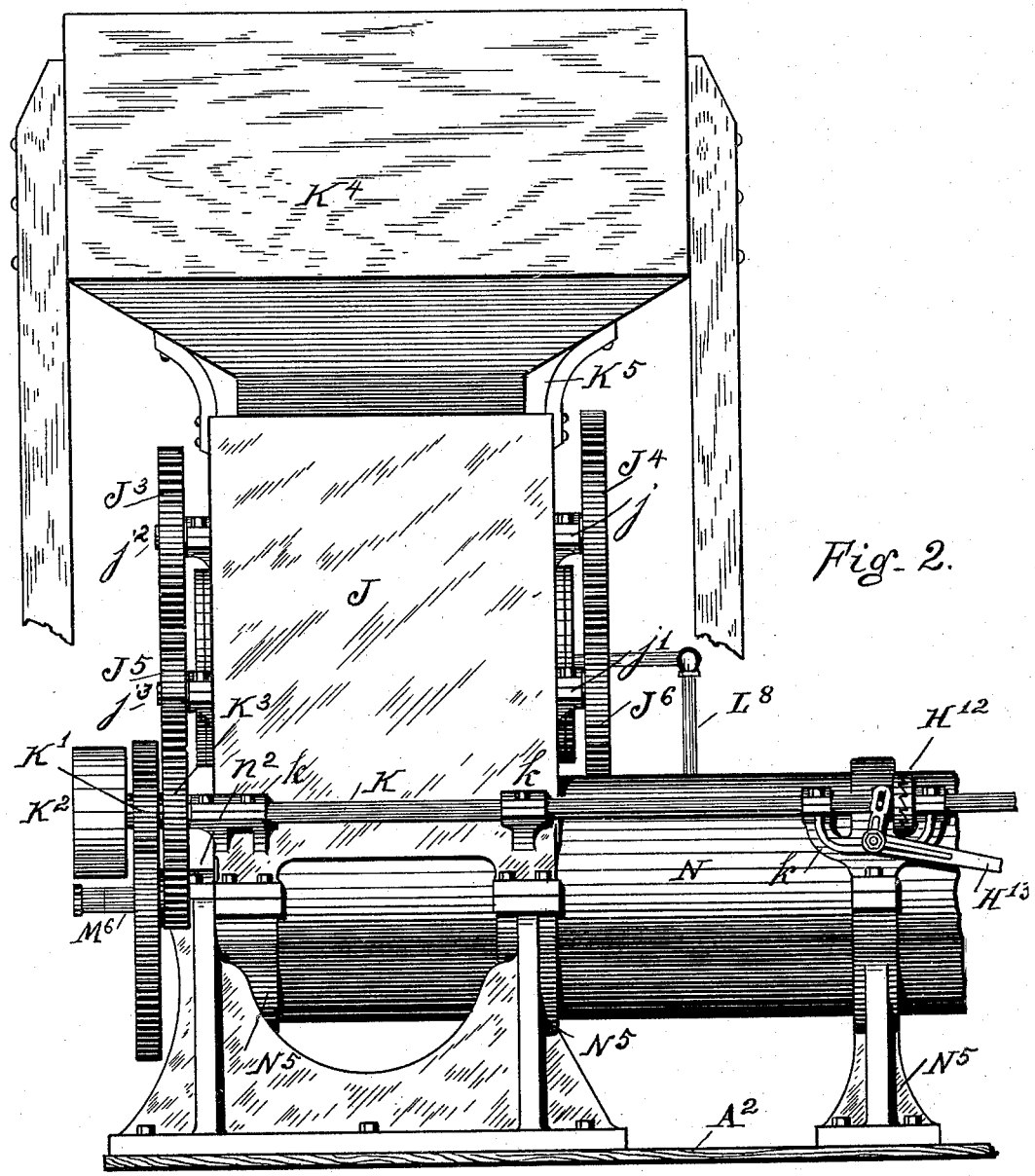
Figure 3:
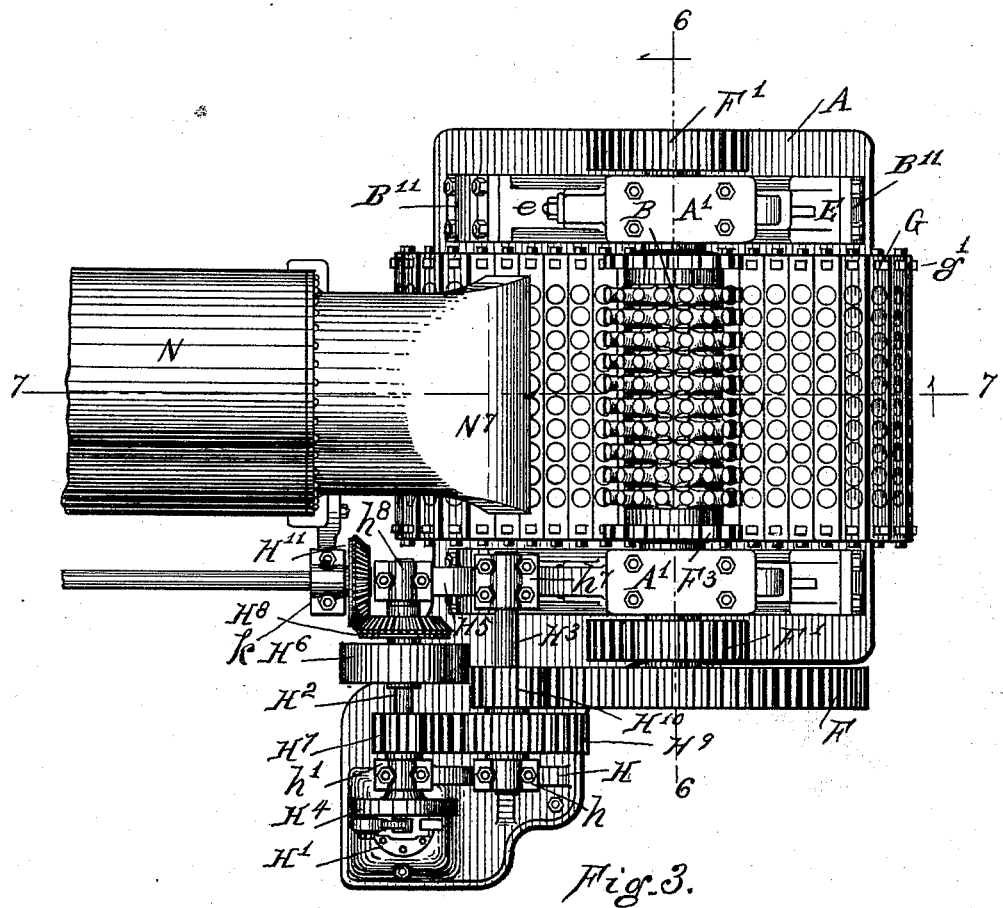
Figure 4:
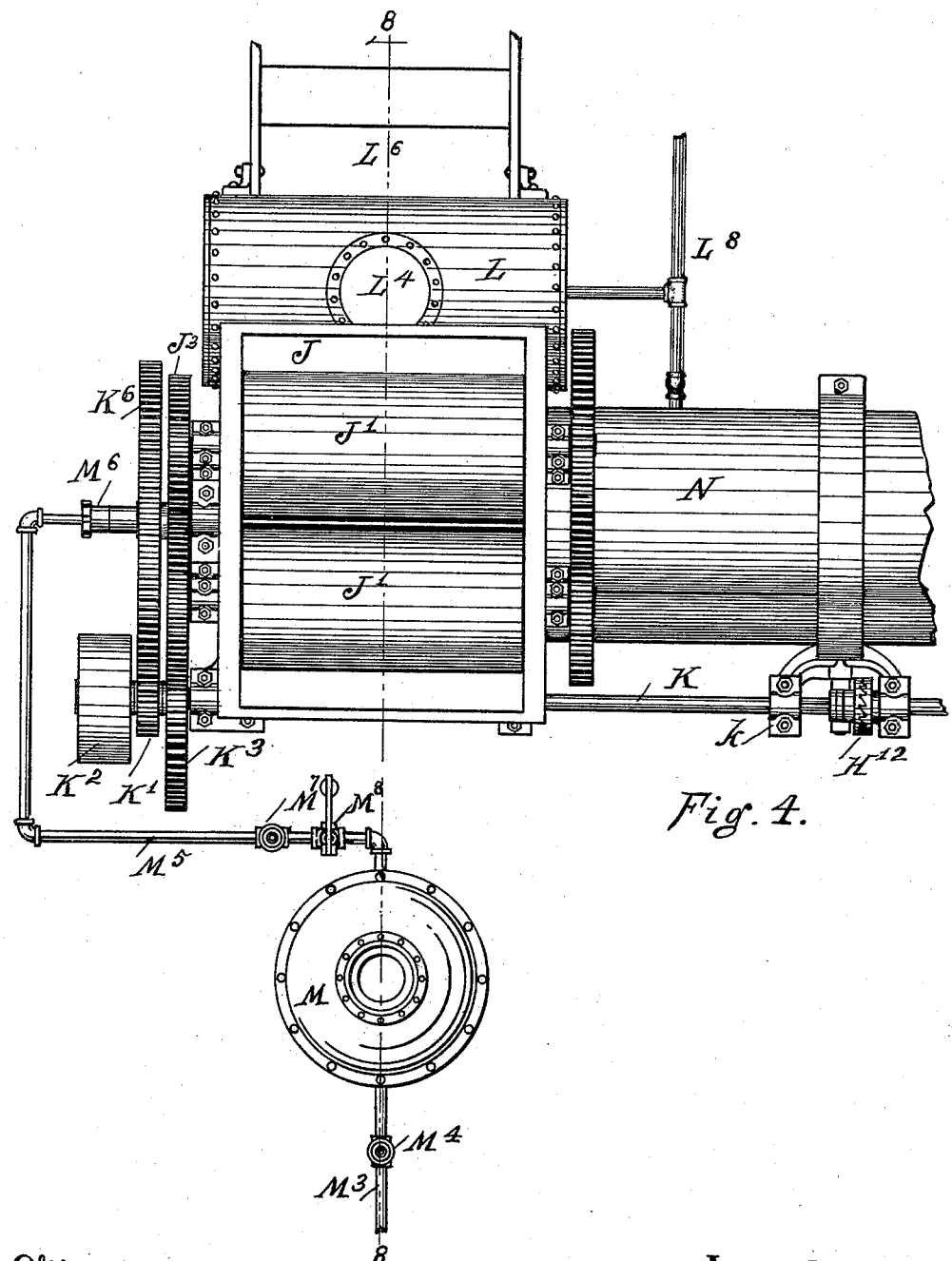
Figure 5:
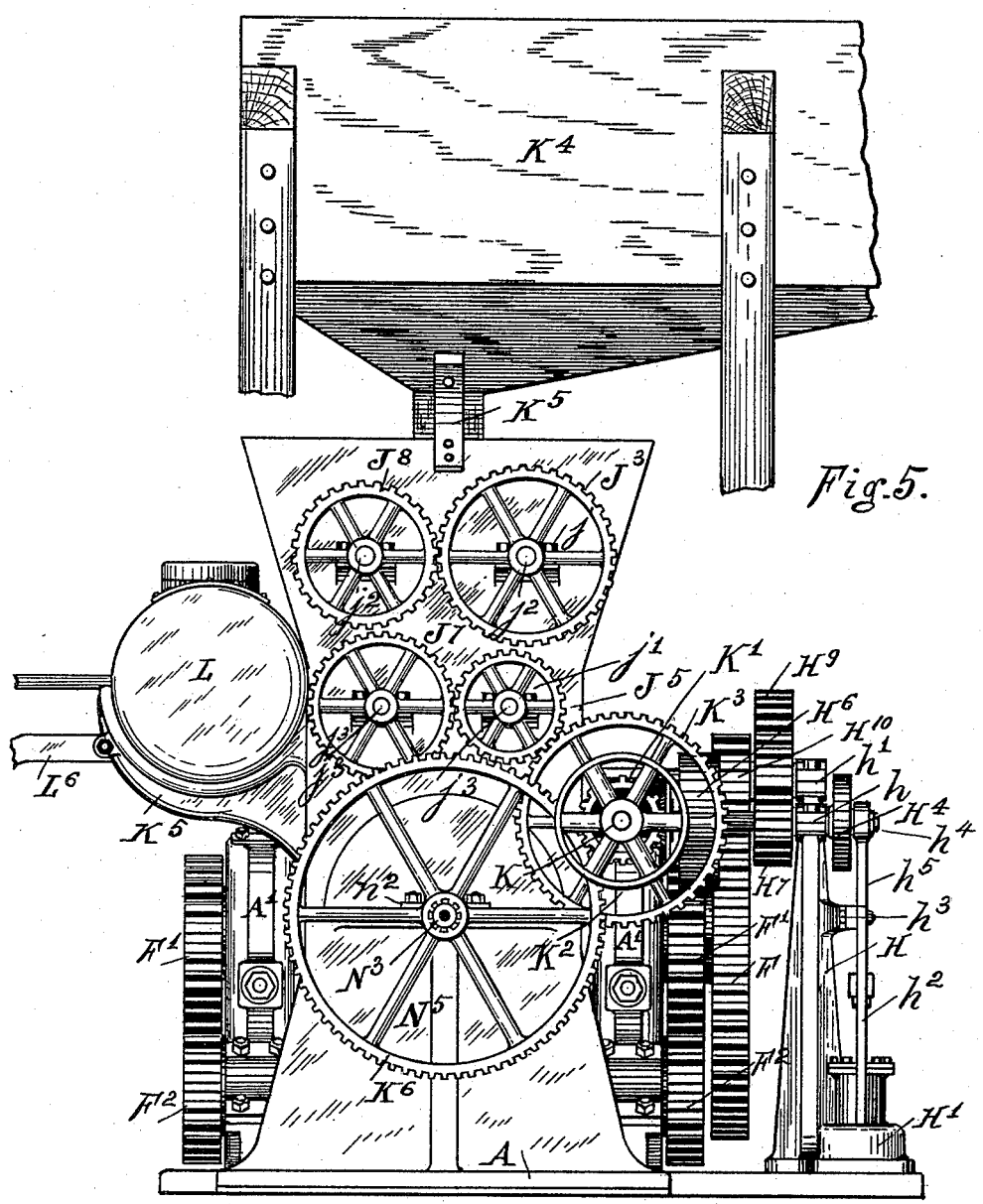
Figure 6:
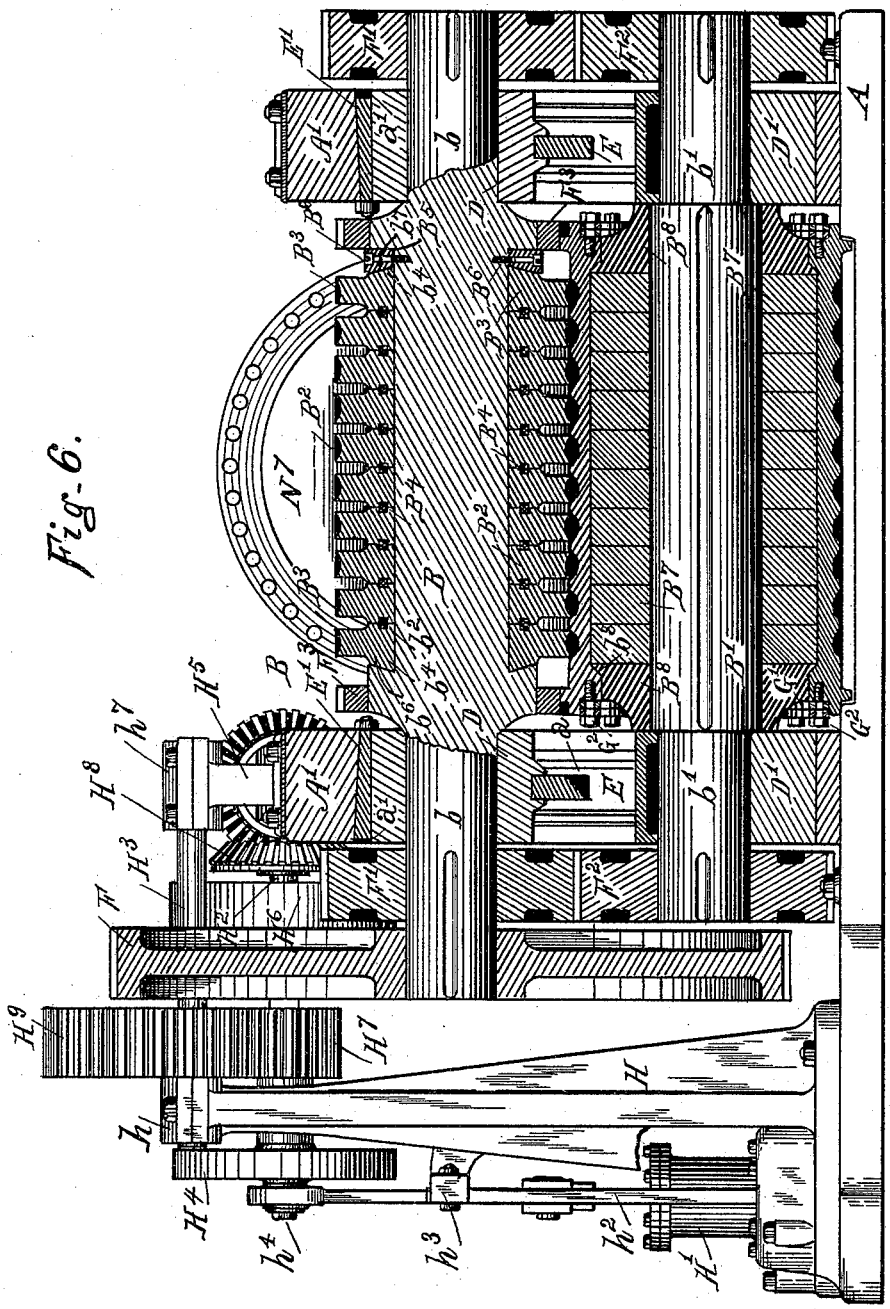
Figure 7:
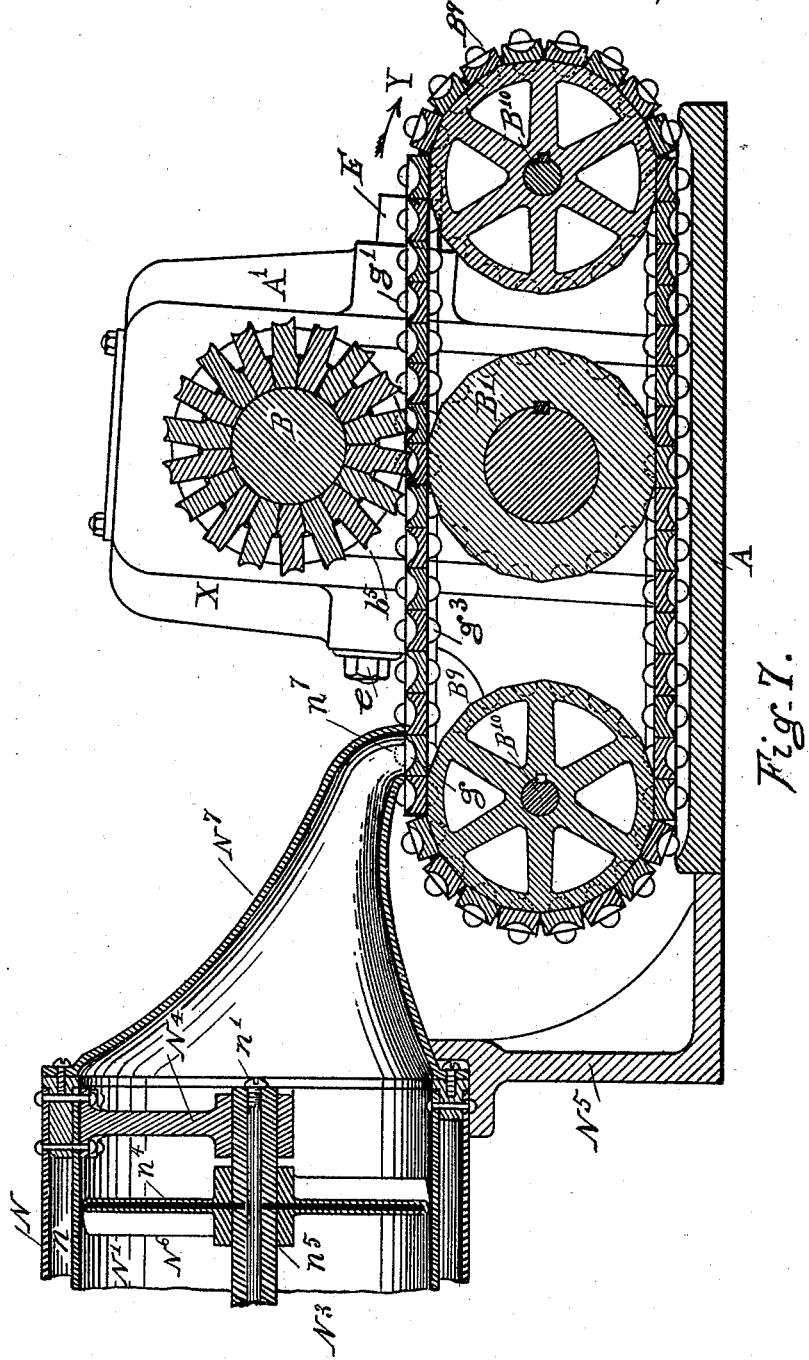
Figure 8:
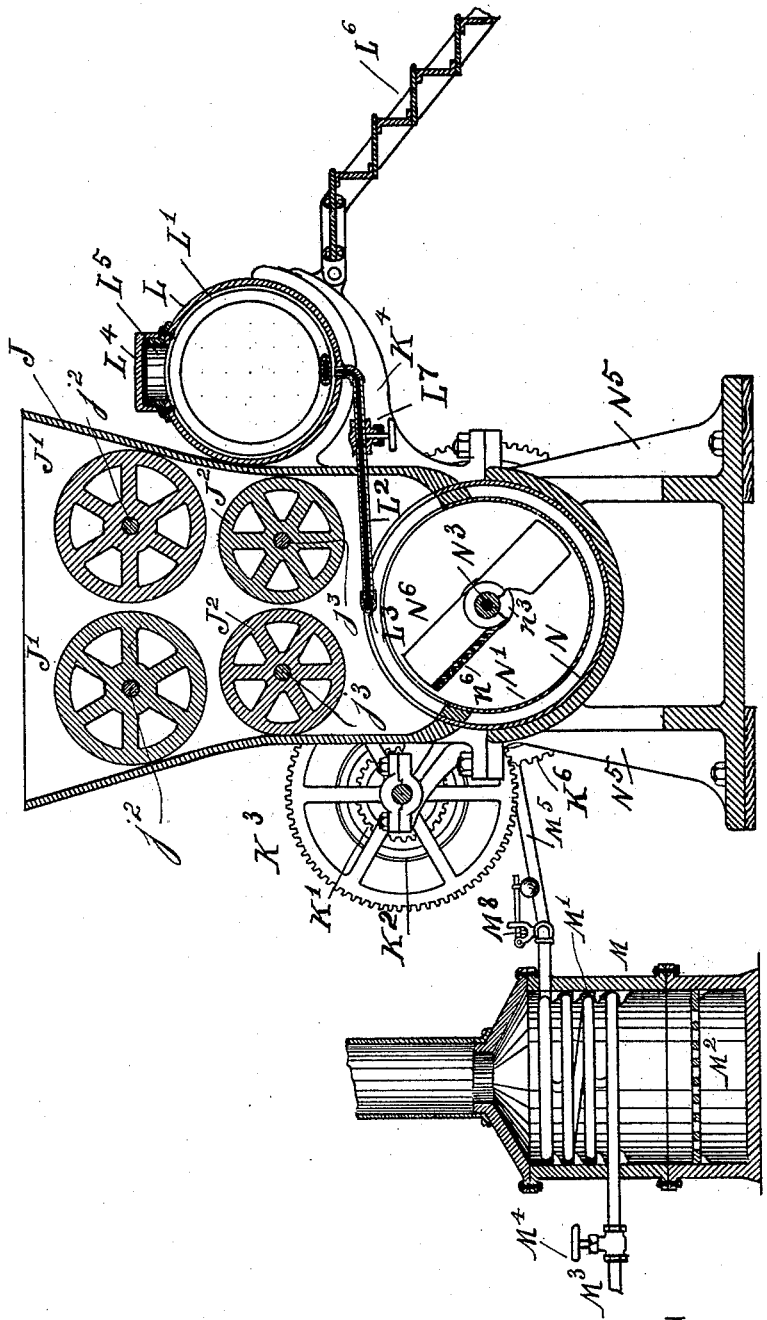
Figure 9:
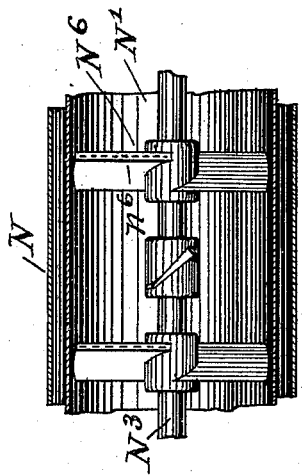
Figure 14:
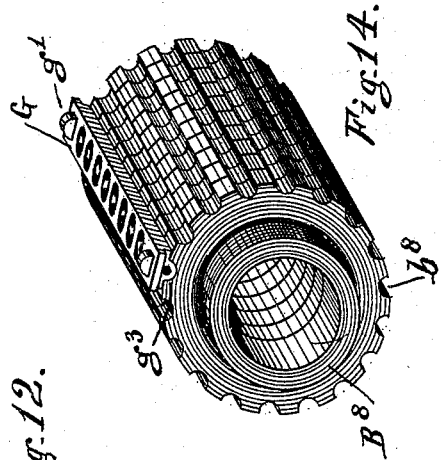
Figure 12:
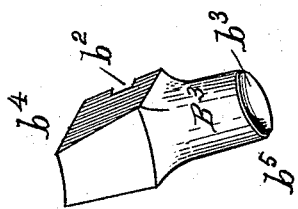
Figure 11:
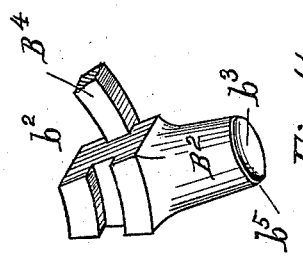
Figure 10:
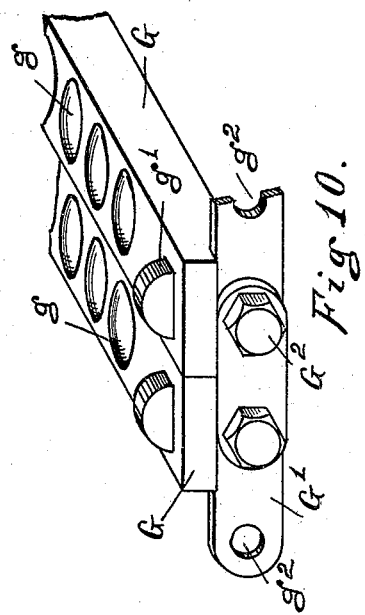

In the drawings, Figure 1 is a side elevation of the right-hand half of the complete machine. Fig. 2 is a side elevation of the left-hand half of the complete machine. The superheating-furnace is omitted from this view in order to more clearly show the parts lying behind it. Fig. 3 is a top plan view of the right-hand half of the machine. Fig. 4 is a top plan view of the left-hand half of the machine. Fig. 5 is an end elevation of the front end of the machine. Fig. 6 is an enlarged vertical transverse section through the compressor-roll and adjacent parts on line 6 of Fig. 3. Fig. 7 is an enlarged vertical longitudinal section on line 7 of Fig. 3. Fig. 8 is a vertical transverse section on the line 8 of Fig. 4. Fig. 9 is a partial vertical longitudinal section through the conveyer-cylinder and shows the conveyer-blades in position on the shaft in the cylinder. Fig. 10 is an enlarged detached perspective view of a part of two staves of the endless chain of molds and illustrates the molds, the sprockets on the mold-staves, the link connecting the staves, and means for connecting the links with the mold-staves. Fig. 11 is an enlarged detached perspective view of one of the segment-blocks of the compressor-roll and shows a part of one of the segmental ties in position on the block. Fig. 12 is an enlarged detached perspective view of one of the segmental key-blocks of the compressor-roll. Fig. 13 is a diagram illustrating in an exaggerated degree the position of the compressor-roll relative to the anvil-roll, also illustrating the coöperation of the segment-blocks and the molds. Fig. 14 is an enlarged detached perspective view illustrating an alternative form of construction of the staves of the endless chain of molds and the rings forming the anvil-roll.

Similar letters of reference designate like parts in all of the views.

For convenience of description I will describe the several parts of the mechanism in the following order: first, the compressor-roll and the parts directly coöperating therewith and the means for actuating same; second, the crushing and pulverizing mechanism; third, the means for supplying the binding material and mixing it with the pulverized fuel material; fourth, the means for impregnating the fuel material with superheated steam, and, fifth, the means for conveying the fuel material from the pulverizer to the molds.

The base A rests on any suitable foundation. Vertical housings A' are suitably secured to the base A. The compressor-roll B and the anvil-roller B' are supported and turn in boxes D and D' in the housings A'. (See Fig. 6.) Underneath the lower half of the boxes D are keys E, which fit in holes $a$ through the housings A', and the keys act against the under side of the boxes, so as to afford means for vertical adjustment of the lower half of the upper boxes. Nuts $e$ on the ends of the keys E afford means whereby the keys may be moved inward or outward at pleasure. Similar keys E', fitting in channels $a'$, afford means for vertical adjustment of the upper half of the boxes D. The shaft $b$ of the compressor-roll B and the shaft $b'$ of the anvil-roll B' turn in the boxes D and D', respectively.

The axis of the roll B is somewhat in front of the axis of the roll B'. The purpose of this arrangement will be hereinafter fully explained. The central part of the roll B is turned down or reduced so as to accommodate the segment-blocks, as clearly shown in Fig. 6. The form of the segment-blocks $B^2$ $B^3$ is clearly shown in Figs. 11 and 12. In the drawings I have shown these blocks as arranged in ten series of eighteen blocks in each series, but a greater or less number of series or a greater or less number of blocks in a series may be used without departing from the spirit of my invention. The number of series and the number of blocks in each series is immaterial so long as the whole surface of the rolls above the molds is covered with segmental blocks adapted to operate in the molds.

The segmental blocks $B^2$ and $B^3$ have one of their ends concaved to correspond to the convex surface of the cylinder, so that when all the blocks are in position on the cylinder the blocks occupy the entire recessed portion of the cylinder. Each side of the blocks $B^2$ has a recess or channel $b^2$, adapted to accommodate segmental ties $B^4$, fitting in the recesses $b^2$ and adapted to interlock the blocks, so as to hold them firmly on the circumference of the roll B and prevent radial displacement of the blocks. In one end of each of the blocks $B^2$ and $B^3$ is a concavity $b^3$, conforming to one-half of the completed fuel-brick. One part $b^5$ of the concaved end of the blocks $B^2$ $B^3$ is somewhat longer than the other parts of the concaved part or the block. The purpose of this elongation will be hereinafter explained. The blocks $B^3$ have the recess $b^2$ on only one of their sides, and the side of the block opposite the recessed side is given a dovetailed form $b^4$, as clearly shown in Figs. 6 and 12.

The segmental ties $B^4$ are preferably made of steel-bar fitted to the recesses $b^2$ and of such length that three ties will encircle the compressor-roll in the recesses $b^2$; but a greater or less number of ties may be used without departing from my invention.

The reduced central portion of the roll B is undercut, as shown at $b^6$, so as to accommodate the dovetailed part $b^4$ of the blocks $B^3$. The other end of the reduced part of the roll B is cut square and accommodates a segmental ring $B^5$, one face of this ring being inclined or tapering, as shown at $b^7$, so as to fit against the dovetailed part $b^4$ of the blocks $B^3$. The ring $B^5$ preferably consists of three segments. Screws $B^6$ pass through the segments $B^5$ and screw into the cylinder and serve to connect the segments with the cylinder. As the segments are screwed down it is obvious that the inclined surface $b^7$ will engage with the dovetail $b^4$ of the blocks $B^3$ and will serve to wedge the blocks firmly together and retain them in position on the roll.

By providing the compressor-roll with segmental blocks interlocked by segmental ties and retained in place by segmental rings, as described, it is obvious that any one of the parts may be readily detached for replacement or repair in case of breakage or injury. This feature I deem to be of great practical value, because in case of injury to one part of the compressor-roll the whole roll need not be discarded, as would be necessary if the blocks were integral with the roll, but the broken part may be taken out and a new part substituted at trifling cost.

The anvil-roll consists of a central roll B', on which are keyed a series of polygonal rings $B^7$, preferably corresponding in number and position to the blocks $B^2$ $B^3$. Hubs $B^8$, secured to the roll B', retain the rings $B^7$ in proper position on the roll B' and prevent longitudinal movement of the rings on the roll. Each face of the polygonal rings corresponds in length to the width of one stave of the endless chain of molds, as clearly shown in Fig. 7.

Each of the hubs $B^8$ has a series of notches $b^8$, adapted to accommodate downwardly-projecting lugs or sprockets on the under side of the staves of the endless chain of molds, and as the hubs $B^8$ revolve they propel the endless chain of molds in an obvious manner.

The chain-drums, around which the endless chain of molds passes, consists of a series of polygonal rings $B^9$, keyed or otherwise suitably connected with the shaft $B^{10}$. The shaft $B^{10}$ turns in boxes $B^{11}$ on the housings A'. (See Figs. 1 and 3.) The number of polygonal rings in each chain-drum preferably corresponds to the number of molds in each stave of the endless chain of molds, but a greater or less number of rings may be used. The purpose of constructing the chain-drums in sections, as described, is that in case of breakage the broken section may be removed and a new one substituted without discarding the whole drum.

The shaft $b$ of the roll B projects through the housings A', and the cog-wheel F and the cog-pinions F' are secured thereto. The cog-pinions $F^2$ are secured in like manner to the shaft of the roll B'. The cog-wheel F is actuated by gearing hereinafter described, and as it turns it revolves the roll B, and the pinions F' mesh with and drive the pinions $F^2$, thereby rotating the roll B' in a direction contrary to the rotative direction of the roll B. Pinions $F^3$ are secured to the roll B, and the teeth of the pinions mesh with corresponding teeth $g'$ on the upper side of the staves of the endless chain of molds and assist in propelling a chain between the compressor-roll and the anvil-roll.

The endless chain of molds consists of a series of staves G, (see Fig. 10,) having in their upper surfaces molds $g$, conforming to the lower part of the fuel-bricks and adapted to contain sufficient material each to form a fuel-brick. At each end of and on the upper side of each stave is an upwardly-projecting tooth $g'$, with which the teeth of the pinion $F^3$ mesh, as already described. The staves G are connected at their outer end by links G'. Each of these links has at each end holes $g^2$, adapted to accommodate bolts $G^2$, which screw into the ends of the staves, and the links turn on the bolts, thereby permitting free adjustment of the staves on the faces of the polygonal rings of the anvil-roll. On the under side of each and near each end of each stave is a downwardly-projecting tooth which works in a socket $b^8$ in the periphery of the hub $B^8$. (See Figs. 6 and 7.) Instead of providing each stave with a downwardly-projecting tooth near each end, as shown in Figs. 6 and 7, each stave may have on its under side a longitudinal rib adapted to work in corresponding longitudinal grooves in the anvil-roll or the chain-drums, as clearly shown in Fig. 14.

It will be seen that the chain of molds is driven from above by the pinions $F^3$ and from below by the hubs $B^8$ on the roll B', thus assuring positive movement of the chain of molds in complete unison with the rotation of the compressor-roll B, thereby obviating all danger of the segment-blocks revolving out of time and riding on top of the chain of molds. The two end sections $B^9$ of the chain-drum have sockets exactly similar to the sockets in the collars $B^8$, and the teeth on the under side of the staves mesh with the sockets in the ring $B^9$ exactly as they do in the collars $B^8$. The gear on the compressor-roll and the gear on the anvil-roll drive the chain of molds, as already described, and the chain drives the chain-drums. A post H is secured in a vertical position on the base A and has at its upper end boxes $h$ $h'$, in which the journals of the shafts $H^3$ and $H^2$ turn, respectively. A steam-cylinder H', (see Fig. 6,) of any suitable dimensions, is secured to the base A. Guides $h^2$ have their lower ends secured to the base of the cylinder H' and their upper ends secured to a projecting arm $h^3$ on the post H. The crank-plate $H^4$ is suitably secured to the shaft $H^2$. A connecting-rod $h^5$ connects the piston-rod $h^6$ with the wrist-pin $h^4$ in the usual well-known manner. The steam-cylinder may be of any suitable form and is supplied with steam in the usual manner. It is not necessary here to describe in greater detail the construction of the steam-cylinder and connected parts, as I do not claim them, broadly, but restrict my claim to their use in combination with other parts of the mechanism, as hereinafter claimed. A bracket $H^5$ on one of the housings A' serves to support in boxes $h^7$ and $h^8$ the inner ends of the shafts $H^3$ and $H^2$, respectively. I prefer to make the bracket $H^5$ integral with the housing A', but it may be made separately and attached thereto. The fly-wheel $H^6$, the cog-pinion $H^7$, and the beveled cog-wheel $H^8$ are secured to and turn with the shaft $H^2$. The cog-pinion $H^{10}$ and the cog-wheel $H^9$ are secured to and turn with the shaft $H^3$. The pinion $H^7$ meshes with and drives the wheel $H^9$, and the pinion $H^{10}$ meshes with and drives the cog-wheel F. When steam is admitted to the cylinder H', the gearing is driven, as already described, so as to rotate the compressor-roll in the direction indicated by the arrow X (see Figs. 1 and 7) and drives the endless chain of molds in the direction indicated by the arrow Y in Fig. 7.

The crushing and pulverizing mechanism, which I will now describe in detail, is in some of its essential features similar to that set forth in my Patent No. 541,069, dated June 18, 1895, (machine for compressing fuel,) to which reference is hereby made. The case or shell J is preferably rectangular in form, and in its upper part is flared outward, as shown in Figs. 5 and 8. The parallel crushing-rolls J' are supported and turn in boxes $j$ on the shell J. In the drawings I have shown the rollers J' as having a plain surface, but they may be either plain or corrugated, as may best adapt them to use with the material used in making the fuel. The pulverizing-rolls $J^2$ are parallel to each other and are supported in boxes $j'$ on the shell J. The rolls $J'$ and $J^2$ are driven at such rate of speed and are so proportioned to each other that the quantity of material crushed by the crushing-rolls shall exactly correspond to the capacity of the pulverizing-rolls, and the pulverizing-rolls shall deliver to the conveyer the exact quantity of material necessary to fill the molds as they successively pass under the discharge-opening of the conveyer.

The cog-wheels $J^3$ and $J^4$ are secured to the shaft $j^2$ of one of the crushing-rolls $J'$. The cog-wheel $J^5$ is secured to one end of the shaft $j^3$ of one of the pulverizing-rolls $J^2$ and meshes with and drives a similar cog-wheel $J^7$, secured to the shaft of the other pulverizing-roll, so as to cause the pulverizing-rolls to revolve toward each other. The cog-wheel $K^3$ on the shaft K meshes with and drives the cog-pinion $J^5$. The cog-pinion $J^6$ is secured to one end of the shaft $j^3$ of one roll $J^2$ and meshes with and drives the cog-wheel $J^4$ on the shaft $j^2$, thereby rotating the cog-wheel $J^3$, which in turn meshes with and drives the cog-wheel $J^8$ and its connected crushing-roll $J'$. On one side of the shell J is a countershaft K, supported in suitable bearings. On this shaft is a cog-pinion $K'$, a pulley $K^2$, and a cog-wheel $K^3$, all of which are secured to and turn with the shaft. The shaft K is in two sections, which are united with or disengaged from each other by a clutch $H^{12}$, of any suitable and convenient form, operated by a shipper-lever $H^{13}$. By means of this clutch the crushing, pulverizing, and conveying mechanism may be operated independently of the compressing mechanism, or the crushing, pulverizing, conveying, and compressing mechanisms may be operated together, as may be most expedient. The pulley $K^2$ may be connected with any suitable motor by means of a belt. The wheel $K^3$ meshes with and drives the cog-wheel $J^5$ on the shaft of one of the pulverizing-rolls, which in turn meshes with and drives the cog-wheel on the shaft of the other pulverizing-roll. The pinion $J^6$ meshes with and drives the cog-wheel $J^4$ on the shaft $j^2$, causing the cog-wheel $J^3$ to intermesh with the cog-wheel $J^8$ and drive both of the crushing-rolls. It will be seen that by gearing the crushing-rolls on one side of the machine with the pulverizing-roll on the other side of the machine I am enabled to revolve the crushing-rolls toward each other. The speed at which the pulverizing and crushing rolls revolve may be varied to control and regulate the delivery of the material to the conveyer by varying the size and proportion of the gear by which the rolls are operated. The crushing and pulverizing mechanism may be driven independently of the conveyer and the compressing mechanism by a belt on the pulley $K^2$, driven by any suitable motor, or the crushing and pulverizing mechanism may be driven by the same motor which operates the compressing mechanism and the conveyer, so that all will coöperate, as hereinafter described. The hopper $K^4$ is suitably supported above and discharges into the shell J above the crushing-rolls $J'$. The means for supplying the binding material and delivering it to the fuel material to be mixed therewith consists of a cylinder L, supported by brackets $K^4$ on the side of the shell J. Within the cylinder is a coil of pipe $L'$, supplied with steam from any convenient source by means of a pipe $L^8$, which also supplies steam to the space $n$ between the cylinders N and $N'$. (See Figs. 4 and 7.) A pipe $L^2$ connects the interior of the cylinder L with the interior of the shell J. On the end of the pipe $L^2$ is a perforated T-pipe $L^3$, serving to spray the mixture within the shell in an obvious manner. On top of the cylinder is a cover $L^4$, covering an opening $L^5$, through which the binding material is admitted to the cylinder. Steps $L^6$ lead from the ground up to and afford convenient means of access to the cylinder. A cock $L^7$ in the pipe $L^2$ serves to control the quantity of binding material delivered within the shell. For binding material I prefer to use coal-tar or asphaltum, but any other suitable material which will soften when heated and when cold will harden to bind and solidify the fuel material may be used.

The means for impregnating the fuel material with superheated steam consists, essentially, of a furnace M and a coil of steam-pipe $M'$ within said furnace and through which steam passes. I have shown a furnace circular in form and provided with a grate $M^2$ below the steam-coil; but any other suitable form of furnace may be used. The pipe $M^3$ connects the steam-coil $M'$ with any convenient source of steam-supply. A check-valve $M^4$, of any suitable form, regulates and controls the admission of steam to the steam-coil $M'$. A pipe $M^5$ has one end connected with the steam-coil $M'$ and the other end connected, by means of a stuffing-box $M^6$, with a pipe $N^3$, passing longitudinally through the center of the conveyer, as will be hereinafter described. A cock $M^7$ in the pipe $M^5$ controls the supply of steam to the pipe in the conveyer. A safety-valve $M^8$, of any suitable form, may be connected with the pipe $M^5$ at any point between the steam-coil and the cock $M^7$. In operation fire is placed on the grate $M^2$, steam is admitted through the pipe $M^3$, and in passing through the coil $M'$ is superheated to the required degree.

The means for conveying the pulverized fuel material from the pulverizing-rolls to the molds consists, essentially, of a cylindrical shell N, inside of which is another cylinder $N'$. These cylinders have a steam-tight connection with each other, so as to form a space $n$ between the cylinders, which is supplied with steam for the purpose of keeping the fuel material heated during its progress from the pulverizing-rolls to the molds. Steam is admitted to the space $n$, surrounding the inside cylinder $N'$, by means of a pipe $L^8$, connected with any suitable source of steam-supply. A pipe $N^3$ extends longitudinally through the center of the cylinder $N'$ and is supported on and turns in hangers $N^4$, placed at suitable intervals within the cylinder $N'$ and secured thereto in any suitable manner. The cog-wheel $K^6$ is secured near the outer end of the pipe $N^3$ and meshes with and is driven by the cog-pinion $K'$. The inner end of the pipe $N^3$ is closed by a screw or plug $n'$ to prevent the discharge of steam through the end of the pipe. The outer end of the pipe $N^3$ is connected with the steam-pipe $M^5$ by means of the stuffing-box $M^6$, as already described. The conveyer-cylinders are supported on and secured to standards $N^5$, which are secured to the subbase $A^2$. The form of these standards and the means for connecting cylinders therewith are immaterial, as it is obvious that the standards of any suitable form may be used and that the cylinders may be secured thereto in any suitable and convenient manner. The outer end of the pipe $N^3$, in addition to its bearings in the hangers $N^4$, is supported and turns in a suitable box $n^2$ on the standard $N^5$ at the outer end of the cylinder. (See Fig. 5.) To that end of the pipe adjacent to the box $n^2$ is secured a collar, (not shown in the drawings,) which receives the end thrust of the pipe $N^3$ as it revolves. Secured to the pipe $N^3$ are blades $N^6$. (See Fig. 7.) These blades have an internal cavity $n^4$, communicating with the interior of the pipe $N^3$ by means of holes $n^5$, registering with the cavities in the blades. In one edge of each of the blades is a series of perforations $n^6$, which communicate with the interior cavity of the blades.

It will be seen that steam entering the pipe $N^3$ will pass out through the perforations in the blades, and as the blades revolve the steam will be thoroughly intermingled with the fuel material during its passage through the cylinder. The blades $N^6$ are in the form of propeller-blades, and as the pipe $N^3$ revolves the blades act against the fuel material to force it forward through the cylinder and discharge it into the molds. At the front end of the cylinder is a nose-shaped extension $N^7$, which at its forward end is narrowed down and is spread out transversely, so that the discharge-orifice $n^7$ will cover all of the molds in one stave of the endless chain of molds. It will be seen then that as the fuel material is forced forward by the blades $N^6$ it will be forced out through the orifice $n^7$ and into the molds $g$.

The elongated part $b^5$ of the blocks $B^2 B^3$ (see Figs. 11 and 12) descends into the mold to a greater depth than the concave face of the block descends. The concave faces $b^3$ of each of the blocks $B^2$ and $B^3$, in conjunction with concave faces of the molds $g$, shape the fuel material, and it is compressed between them into fuel-bricks of form and size corresponding to the coöperating concave faces of the blocks and the molds.

The conformation of the fuel-bricks and the greater part of the compression thereof are attained at that degree of rotation of the compressor-roll and the anvil-roll at which the central points of the molds and the central points of the blocks are in a plane passing through the axial line of both rolls.

The axis of the compressor-roll $B$ lies somewhat in front of the axis of the anvil-roll $B'$.

The chain of molds moves horizontally between the compressor-roll and the anvil-roll and in a plane oblique to a plane passing through the axis of the rolls. Hence the place of ultimate or lowest pressure of each of the blocks $B^2 B^3$ on its corresponding mold is at a point in front of a plane passing through the axis of the rolls. This is illustrated in the diagram Fig. 13, in which $B$ is a circle of the compressor-roll, $B'$ is a circle of the anvil-roll, $b^9$ the center of the circle $B$, and $b^{10}$ the center of the circle $B'$.

During the operation of compressing the fuel-bricks the greater part of the conformation and compression of the fuel-bricks is attained when the rolls $B$ and $B'$, revolving in unison, exert pressure in the line $b^9 b^{10}$. After this stage of the operation is passed the chain of molds continues to move horizontally, but the roll $B'$ revolves away from the chain of molds and ceases to exert any pressure thereon. The roll $B$ continues to exert downward pressure on the fuel material, and in traversing the arc $X'$ the segment-blocks which are compressing the fuel into the molds descend into the molds an additional vertical distance, (represented by the line $Y'$.) This additional descent of the segment-blocks into the molds gives additional pressure to the fuel-bricks. It also brings the elongated part $b^5$ of the segment-blocks to the bottom of the molds and behind the fuel-bricks in such position that as the roll $B$ continues to revolve the elongated part $b^5$ of the segment-blocks will press against the rear part of and to a limited extent move under the fuel-bricks, so as to loosen and slightly turn them in the molds, to the end that the fuel-bricks may not stick in the molds, but may be free to fall out as the chain of molds moves around the front chain-drum.

I will now explain the practical advantage which I gain by placing the axis of the roll $B$ in front of the axis of the roll $B'$, reference being had to Fig. 13, in which the circle in dotted lines represents the position which the roll $B$ would occupy if placed with its axis in a vertical plane with the axis of the roll $B'$. If the axis of the roll $B$ is placed in front of the axis of the roll $B'$ a distance represented by the line $Z$, the distance between the axes of the rolls remaining the same, it is obvious that the center $b^9$ will lie below the center $b^{11}$ a distance represented by $X^2$, which is equal to the distance $W$. In other words, when the roll $B$ is moved forward the distance $Z$ it is at the same time lowered the distance represented by $X^2$, in order that while the distance W between the rolls remains the same the upper roll may be brought closer to the horizontal chain of molds and in order that the segment-blocks may descend deeper into the molds a distance measured by the line $Y'$. By reason of this lowering of the roll B and increased descent of the segment-blocks into the molds the elongated parts $b^5$ are brought directly behind the fuel-bricks and serve to loosen them, as hereinbefore described. By reason of the roll B being brought nearer to the chain of molds the segment-blocks sink deeper into the molds and hence traverse a longer arc within the molds. For illustration, let the line V represent the top surface of the chain of molds. If the roll B is placed in the position indicated by dotted lines, the segment-blocks on the rolls would coöperate with the molds to the extent of the arc distended by the chord $V'$, whereas if the compressor-roll is placed in the position indicated by the solid line B the segment-blocks will coöperate with the molds within an arc measured by a chord equal in length to the line $V^2$. It will be noted also that in the second case the arc of the circle of revolution of the roll enters and leaves the molds more abruptly than in the first case.

It is obvious then that when the compressor-roll occupies the position shown by the solid circle B the elongated parts $b^5$ of the segment-blocks will remain longer in engagement with the fuel-bricks, and hence will more certainly perform their function of loosing the bricks in the molds, and after that is done will more rapidly rise away from the fuel-bricks, so as to obviate all danger of completely overturning the bricks and throwing them out of the molds, as well as all danger of scraping or crushing the bricks, than they would do if the compressor-roll were placed in the position shown by the dotted circle.

By reference to Fig. 7 it will be seen that the length of the polygonal faces of each section of the anvil-roll is equal to the width of the staves of the endless chain of molds, and the width of each of these staves and polygonal faces is such that when the uppermost face of the anvil-roll is in a horizontal position the superposed stave of the endless chain of molds is in contact with the face of the anvil-roll and continues in such contact during the whole of the time in which the compressor-roll is traversing the arc $X'$ and in which the formative pressure and the ultimate pressure on the fuel-bricks are being made. Hence it is impossible for the staves to pass through between the roll without the fuel material being completely compressed into fuel-bricks in the molds and said fuel-bricks being loosened in said molds, as hereinbefore described.

The practical operation of the complete apparatus is as follows: The hopper is first supplied with coal, slack, or other suitable fuel-material and the tank L is supplied with binding material. Steam from any suitable steam-supply is then admitted to the tank L through the pipe $L^8$ to heat and liquefy the binding material. After the binding material is sufficiently heated steam from any suitable steam-supply is admitted to the cylinder $H'$, also to the steam-coil $M'$, fire having been previously started in the furnace containing the steam-coil, and the valves communicating with the interior of the cylinder $N'$ having been previously opened. Upon the admission of steam to the cylinder $H'$ all of the revolving parts of the mechanism are set in motion. The fuel material in the hopper is crushed between the revolving crushed rolls and falls down on the pulverizing-rolls, by which it is pulverized. Thereupon the liquefied binding material is sprayed through the perforated pipe $L^3$ upon the pulverized fuel material during its fall from the pulverizing-rolls into the mouth of the cylinder $N'$. In its passage through the cylinder $N'$ the fuel material is impregnated with steam emerging through the perforations $n^6$ in the blades $N^6$. As the blades $N^6$ revolve they drive the fuel material forward in the cylinder and force it out through the orifice $n^7$ into the molds $g$, in which it is compressed by the segmental blocks on the compressor-roll, as already described. After the fuel-bricks are compressed, as described, they are carried by the endless chain of molds around the front chain-drum, whence they fall into any suitable receptacle or may be conveyed away by any suitable means.

Having fully described my invention, what I claim as new, and desire to secure by Letters Patent, is—

1. A segment-block adapted to coöperate with molds, said block having one end concave and having at its concave end an elongated part as set forth; in combination with a rotatable roll with which said segment-block is connected; and molds adapted to coöperate with said segment-block as set forth.

2. In a chain of molds the combination of a series of staves having molds, axial bolts in the ends of each of said staves, and links connecting said axial bolts, as set forth.

3. In a fuel-compressor a chain of molds, consisting of a series of staves provided with molds and teeth $g'$ and $g^3$, axial bolts in the ends of said staves and links connecting said bolts, in combination with a rotatable polygonal anvil-roll having sockets in which the teeth $g^3$ mesh, and having faces with which the staves of said chain of molds successively contact, rotatable chain-drums having sockets with which the teeth $g^3$ mesh, and a rotatable compressor-roll having pinions with which the teeth $g'$ mesh, also having members adapted to compress fuel in the molds of the chain of molds, as set forth.

4. In a fuel-compressor the combination of a main frame; an anvil-roll, and chain-drums supported and turning on said frame; a chain of molds supported on and moving with said anvil-roll, and chain-drums; and a rotatable compressor-roll above the chain of molds and provided with members adapted to compress fuel in molds, the axis of said compressor-roll being above and in front of the axis of said anvil-roll; all coöperating as set forth.

5. In a fuel-compressor, the combination of a main frame; a rotatable anvil-roll, and a rotatable compressor-roll supported and turning on the main frame, the axis of said compressor-roll being above and in front of the axis of said anvil-roll, said compressor-roll being provided with members adapted to compress fuel in molds, and said members being provided with elongations, substantially as set forth; and horizontally-moving molds interposed between said anvil-roll and compressor-roll; all coöperating to form and compress fuel-bricks in said molds, and when said bricks are so formed and compressed, coöperating to loosen said bricks in the molds: as set forth.

6. In a fuel-compressor the combination of a rotatable polygonal anvil-roll provided with sockets; rotatable chain-drums provided with sockets; a rotatable compressor-roll provided with cog-pinions and having members adapted to compress fuel in molds; and a chain of molds consisting of a series of staves each having molds and having on its upper and lower sides teeth adapted to mesh with the pinions on said compressor-roll and the sockets on said anvil-roll respectively, said staves being so connected that each stave is free to turn on its own central axis independently of the other staves of the chain of molds; as set forth.

In witness whereof I have hereunto subscribed, at Springfield, Illinois, this 31st day of May, 1895.

THOMAS M. COCHRANE.

Witnesses:
FRANK HUDSON,
JAMES BREWER.